(12) United States Patent
Schüepp

(10) Patent No.: US 9,537,844 B2
(45) Date of Patent: Jan. 3, 2017

(54) ACCESS CONTROL TO OPERATING MODULES OF AN OPERATING UNIT

(71) Applicant: Ferag AG, Hinwil (CH)

(72) Inventor: Michael Schüepp, Illnau (CH)

(73) Assignee: FERAG AG, Hinwil (CH)

( * ) Notice: Subject to any disclaimer, the term of this patent is extended or adjusted under 35 U.S.C. 154(b) by 542 days.

(21) Appl. No.: 14/032,146

(22) Filed: Sep. 19, 2013

(65) Prior Publication Data

US 2014/0082723 A1    Mar. 20, 2014

(30) Foreign Application Priority Data

Sep. 20, 2012 (CH) ...................... 1708/12

(51) Int. Cl.
| | | |
|---|---|---|
| *G06F 21/00* | (2013.01) | |
| *H04L 29/06* | (2006.01) | |
| *G05B 19/042* | (2006.01) | |
| *G06F 21/62* | (2013.01) | |
| *G06F 21/83* | (2013.01) | |

(52) U.S. Cl.
CPC ............ *H04L 63/08* (2013.01); *G05B 19/0428* (2013.01); *G06F 21/629* (2013.01); *G06F 21/83* (2013.01); *G05B 2219/23043* (2013.01); *G05B 2219/24159* (2013.01); *G05B 2219/24168* (2013.01); *G05B 2219/36163* (2013.01); *G05B 2219/36542* (2013.01); *G06F 2221/2117* (2013.01); *G06F 2221/2141* (2013.01)

(58) Field of Classification Search
CPC  G06F 21/83; G06F 21/629; G06F 2221/2117; G06F 2221/2141; G05B 19/0428; G05B 2219/23043; G05B 2219/24159; G05B 2219/24168; G05B 2219/36163; G05B 2219/36542; H04L 63/08
See application file for complete search history.

(56) References Cited

U.S. PATENT DOCUMENTS 8,132,240 B2    3/2012  Jurisch
2006/0074917 A1*  4/2006  Chand .................... H04L 63/10
(Continued)

FOREIGN PATENT DOCUMENTS

DE            10025791 A    11/2001

*Primary Examiner* — Michael Pyzocha
(74) *Attorney, Agent, or Firm* — Knobbe, Martens, Olson & Bear, LLP

(57) ABSTRACT

The invention relates to an operating unit (1) for a production plant (2). The operating unit (1) comprises an authorization receiving module (71) so as to receive authorization identifications (61, 62, 63, 64) which are sent out by operating modules (51, 52, 53, 54) of the operating unit (1), an authorization storage module (72) so as to store in an authorization data storage (8) authorization data including allocations of user identifications (31, 32, 33, 34, 41, 42) to the received authorization identifications (61, 62, 63, 64), and an authorization checking module (73) so as to receive at least one authorization identification (61, 62, 63, 64) from the operating modules (51, 52, 53, 54) and to determine at least one user identification (31, 32, 33, 34, 41, 42), and to unlock an operating module (51, 52, 53, 54) if in the authorization data storage (8) an allocation of the at least one user identification (31, 32, 33, 34, 41, 42) to the at least one authorization identification (61, 62, 63, 64) is stored.

19 Claims, 3 Drawing Sheets

(56) References Cited

U.S. PATENT DOCUMENTS

| | | | |
|---|---|---|---|
| 2008/0033588 A1* | 2/2008 | Kubo | G05B 15/02 700/108 |
| 2008/0147953 A1* | 6/2008 | Lawandus | H04L 63/0861 710/313 |
| 2009/0079537 A1* | 3/2009 | Seitz | G05B 19/406 340/5.2 |
| 2009/0171479 A1* | 7/2009 | Oosako | G05B 19/042 700/79 |
| 2009/0183244 A1* | 7/2009 | Saraf | G06F 21/604 726/6 |
| 2009/0299827 A1* | 12/2009 | Puri | G06Q 10/06398 705/7.42 |
| 2010/0121663 A1* | 5/2010 | Valeriano | G06Q 10/087 705/400 |
| 2010/0201480 A1* | 8/2010 | Falk | G05B 19/042 340/5.8 |
| 2010/0315198 A1 | 12/2010 | Jurisch | |
| 2011/0082569 A1* | 4/2011 | Bellville | G05B 19/0426 700/79 |
| 2012/0095026 A1 | 4/2012 | Honigberg et al. | |
| 2012/0297461 A1* | 11/2012 | Pineau | H04L 63/0815 726/4 |
| 2012/0319838 A1* | 12/2012 | Ly | H04Q 9/00 340/540 |
| 2012/0330454 A1* | 12/2012 | Giles | G06F 9/4443 700/159 |
| 2013/0014251 A1* | 1/2013 | Nogami | G06F 21/31 726/19 |
| 2013/0031614 A1* | 1/2013 | Cossard | G06F 21/31 726/4 |
| 2013/0184847 A1* | 7/2013 | Fruh | G05B 19/41875 700/109 |
| 2015/0177719 A1* | 6/2015 | Wang | G05B 23/0208 700/83 |

* cited by examiner

ACCESS CONTROL TO OPERATING MODULES OF AN OPERATING UNIT

CROSS-REFERENCE TO RELATED APPLICATIONS

This application claims priority to Swiss Application No. 01708/12, filed Sep. 20, 2012.

BACKGROUND

1. Field of the Invention

The invention relates to an operating unit for a production plant and to a method for operating an operating unit for a production plant.

2. Description of the Related Art

Known from the prior art are production plants such as, for example, product processing plants or printing product processing plants. These are highly complex and spacious plants which, depending on the application, are often arranged in a plurality of buildings and rooms. Operating production plants is carried out by at least one user and at least one operating unit. Users have different tasks. Operating units can be provided for a plant supervisor or "administrator", which operating units allow a comprehensive operation of the production plant. Operating units for "service persons" can be provided which merely enable starting and stopping of certain plant sections so as to be able to carry out service work. Operating units for "machine operators" can be provided which, for example, enable adjusting of production speeds.

Maintaining operating units for different tasks requires significant configuration expenditures. If new operating functions are made available, for example by adding new operating modules to the operating unit, significant configuration expenditures are necessary again to appropriately adjust all operating units.

SUMMARY

It is an object of the present invention to propose an operating unit for a production plant and a method for operating an operating unit for a production plant which at least avoid or reduce certain disadvantages of the prior art. It is in particular an object of the present invention to propose an operating unit for a production plant and a method for operating an operating unit for a production plant which can be easily configured, wherein in particular configuration data in different operating units can be rapidly updated and remain consistent.

According to the present invention, these objects are achieved by the elements of the independent claims. Further advantageous embodiments also arise from the dependent claims and the description.

An operating unit for a production plant comprises: an authorization receiving module which is set up to receive authorization identifications which are sent out by operating modules of the operating unit, an authorization storage module which is set up to store, in an authorization data storage, authorization data including allocations of user identifications to the received authorizations, and an authorization checking module which is set up to receive at least one authorization identification from the operating modules and to determine at least one user identification, and to unlock an operating module from which an authorization identification has been received, to a user defined by the at least one user identification if in the authorization data storage an allocation of the at least one user identification to the at least one authorization identification is stored. Based on the authorization identification, operating functions for operating the production plant are defined by the operating modules and are collected by the authorization receiving module. Via user identifications, the authorization storage module allocates users to the authorization identifications of the operating modules and therefore to certain functions of the operating modules. For example, when triggering an operation of the production plant through an operating module of the operating unit, the authorization identification is transmitted to the authorization checking module and it is checked whether access by the user is to be unlocked or not to be unlocked, i.e., is to be blocked. Since the operating modules independently administer the authorization identifications, configuring the operating unit can be carried out rapidly.

In one embodiment, the authorization checking module is set up to determine the at least one user identification based on one or more of the following processes: requesting the user identification from a user identification module of the operating unit, receiving the user identification from a user validation module of the operating unit, receiving the user identification from an operating module of the operating unit. Thus, for example, the user identification of the current user of the operating unit can be determined and can be taken into account for enabling of operating modules. The user identification module is set up, for example, to store the user identification of the current user of the operating unit, for example after the user has logged on to the operating unit with user name and password. The user validation module, for example, is set up to check the current user of the operating unit, for example by requesting from the user to provide logon information such as, e.g., a user name and a password.

In one embodiment, the authorization storage module is set up to interact with a user interface of the operating unit so as to request information from a user on the allocation of user identifications to authorization identifications and to accordingly make the allocations in the authorization data storage. The configuration of the operating modules of the operating unit can be carried out directly at the operating unit, wherein in particular by a subsequently described synchronization of configuration data, the configuration changes of a multiplicity of operating units are available identically and consistently.

In one embodiment, the authorization storage module is set up to store, in the authorization data storage, authorization data including allocations of user identifications to the received authorization identification as allocations of user names to user roles and as allocations of user roles to authorization identifications. Thereby, the possibilities of operating the production plant, which possibilities are available to the user of the operating units, can be efficiently defined for user groups.

In one embodiment, the authorization storage module is set up to protect against abusive change through an electronic signature the authorization data stored in the authorization data storage. As a result, the users of the operating unit cannot enable access to an operating module, in particular not by mistake, if the access is not intended.

In one embodiment, the operating unit comprises a synchronization module that is set up to synchronize the authorization data stored in the authorization data storage with authorization data that is stored in a remotely arranged authorization data storage of a remotely arranged operating unit. Thereby, the authorization data are identically available on a plurality of operating units of the production plant, wherein, for example, new operating modules, new authorization identifications and/or user identifications of new users are always updated identically and consistently. The operating units of the production plants are updated in terms of recent upgrades without requiring major configuration efforts.

In one embodiment, the operating unit comprises a master/slave register which is set up to define the operating unit as a master or as a slave, wherein in the case of an operating unit defined as a master, the synchronization module is set up to synchronize the authorization data stored in the authorization data storage only with remotely arranged operating units which are defined as a slave, and in the case of an operating unit defined as a slave, it is set up to synchronize the authorization data stored in the authorization data storage only with a remotely arranged operating unit which is defined as a master. By defining a single master and a plurality of slaves, in particular, a clear and fast synchronization of data between the operating units is ensured.

In one embodiment, the synchronization module is set up to trigger the synchronization between the authorization data stored in the authorization data storage and the authorization data stored in a remotely arranged authorization data storage of a remotely arranged operating unit based on one or more of the following events: end of a time interval, receipt of a trigger signal for synchronization, detection of changes in authorization data stored in the authorization data storage, detection of availability of access of a network interface of the operating unit to a communication network. After expiry of a time interval, regular synchronization can be carried out in order to keep the configuration data consistent. A device of the operating unit can trigger a synchronization explicitly by means of a trigger signal, for example after a user manager has added a user with a new user identification. Detection of changes in the authorization data storage can take place, for example, by a monitoring process (watchdog) which determines in regular intervals a hash total of the stored data and triggers a synchronization if the hash total changes. After an interruption of a communication network, for example in the case of a mobile operating unit with a radio-based network interface, the operating unit can be rapidly provided again with current authorization data, for example, even after switching on the operating unit immediately after a long period of non-use.

In one embodiment, the authorization storage module is set up to transmit to the synchronization module, after storing authorization data in the authorization data storage, a trigger signal for synchronizing the authorization data with authorization data stored in an authorization data storage of a remotely arranged operating unit. After authorization data on an operating unit have been updated, said data is therefore immediately synchronized with other operating units.

In addition to an operating unit for a production plant, the invention relates to a method for operating an operating unit for a production plant, comprising: Receiving authorization data which are sent out by operating modules of the operating unit, storing authorization data including allocations of user identifications to the received authorization identifications in an authorization data storage, and receiving at least one authorization identification from the operating modules and determining at least one user identification and enabling an operating module from which an authorization identification has been received for a user defined by the at least one user identification, if in the authorization data storage an allocation of the at least one user identification to the at least one authorization identification is stored.

In one variant, the at least one user identification is determined based on one or more of the following processes: Requesting the user identification from a user identification module of the operating unit, receiving the user identification from a user validation module of the operating unit, receiving the user identification from an operating module of the operating unit.

In one variant, information on the allocation of user identifications to authorization identification is requested by a user through the interaction with a user interface of the operating unit, and the allocations are made accordingly in the authorization data storage.

In one variant, authorization data including allocations of user identifications to the received authorization identifications are stored in the authorization data storage as allocations of user names to user roles and as allocations of user roles to authorization identifications.

In one variant, the authorization data stored in the authorization data storage are protected through an electronic signature against abusive change.

In one variant, the authorization data stored in the authorization data storage are synchronized by means of a synchronization module with authorization data stored in a remotely arranged authorization data storage of a remotely arranged operating unit.

In one variant, the operating unit is defined as a master or as a slave, wherein in the case of an operating unit defined as a master, the authorization data stored in the authorization data storage are synchronized only with remotely arranged operating units which are defined as a slave, and in the case of an operating unit defined as a slave, the authorization data stored in the authorization data storage are synchronized only with a remotely arranged operating unit which is defined as a master.

In one variant, the synchronization in the synchronization module between the authorization data stored in the authorization data storage and authorization data stored in a remotely arranged authorization data storage of a remotely arranged operating unit is triggered based on one or more of the following events: end of a time interval, receipt of a trigger signal for synchronization, detection of changes in the authorization data stored in the authorization data storage, detection of availability of access of a network interface of the operating unit to a communication network.

In one variant, after storing authorization data in the authorization data storage, a trigger signal for synchronizing the authorization data with the authorization data stored in an authorization data storage of a remotely arranged operating unit is transmitted to the synchronization module.

In addition to an operating unit for a production plant and a method for operating an operating unit for a production plant, the invention further relates to a computer program product, comprising a tangible computer-readable storage medium with a stored computer code which is set up to control one or more processors of an operating unit for a production plant in such a manner that: authorization identifications are received which are sent out by operating modules of the operating unit, authorization data including allocations of user identifications to the received authorization identifications are stored in an authorization data storage, and at least one authorization identification from the operating modules is received and at least one user identification is determined, and an operating module, from which an authorization identification has been received, is unlocked to a user defined by the at least one user identification if in the authorization data storage an allocation of the at least one user identification to the at least one authorization identification is stored.

BRIEF DESCRIPTION OF THE DRAWINGS

The invention is explained hereinafter with reference to figures which merely illustrate exemplary embodiments. In the figures.

DETAILED DESCRIPTION

Figure 1:
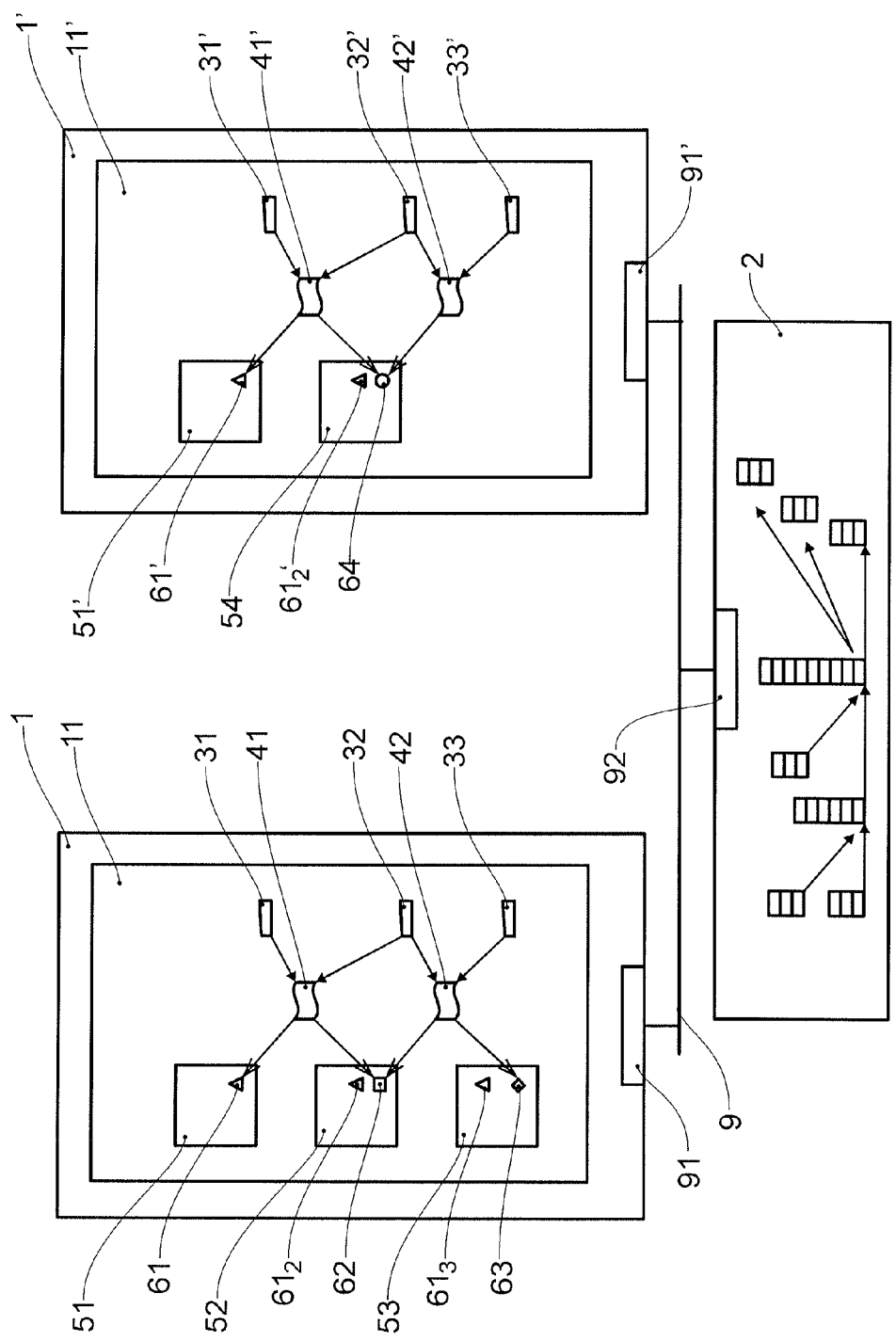
FIG. 1 schematically shows operating units with operating modules and an allocation between user identifications comprising user names and user roles, and authorization identifications of the operating modules.

FIG. 1 shows a first operating unit 1 and a second operating unit 1' which are set up for operating a production plant 2. The operating units 1, 1', for example, have network interfaces 91, 91' which are set up for connecting to a communication network 9. The production plant 2, for example, has a network interface 92 which likewise is set up for connecting to the communication network 9. Thus, through the communication network 9, communication connections between the operating units 1, 1' and the production plant 2 can be established, in particular for operating the production plant 2 through the operating units 1, 1'.

In one embodiment, the network interfaces 91, 91', 92 of the operating units 1, 1' and the production plant 2 relate to tethered network interfaces such as, for example, Ethernet interfaces, wireless interfaces such as, for example, WLAN interfaces according to an IEEE 802.11a/b/g/n/y standard (WLAN: Wireless Local Area Network, IEEE: Institute of Electrical and Electronics Engineers) or Bluetooth interfaces, or any other communication interfaces. The communication network 9 has network devices such as, e.g., Ethernet cables, Ethernet switches, Ethernet routers, WLAN routers, Bluetooth interfaces, etc.

In one variant, in addition to the first operating unit 1 and the second operating 1', further operating units are provided which are configured in the same or similar manner as the first and the second operating units 1, 1'. In the present case, the designation "operating units 1, 1'" designates in each case one or more of these operating units. In one variant, the operating units 1, 1' comprise stationary operating units and/or mobile operating units. In one embodiment, a stationary operating unit has a large-format touchscreen, for example a 40 inch touchscreen, a 46 inch touchscreen or a touchscreen of any other size. In one variant, a mobile operating unit 1, 1' has a small-format touchscreen, for example a 7 inch touchscreen, a 10 inch touchscreen or a touchscreen of any other size. In one embodiment, the operating units 1, 1' comprise one or more personal computers (PC), one or more laptop computers, one or more mobile radio devices, one or more tablet computers, etc.

In one embodiment variant, the operating units 1, 1' have a plurality of network interfaces, and the network 9 is divided, for example, into a first network for the communication between the operating units 1, 1' themselves, and a second network for the communication between the operating units 1, 1' and the production plant 2.

For example, the operating units 1, 1' comprise network interfaces for the connection to the first network and network interfaces for the connection to the second network. In one variant, for example, the second network is configured to be more robust than the first network, as a result of which the communication between the operating units 1, 1' and the production plant 2 has a higher connection reliability than the communication between the operating units 1, 1' themselves.

The operating units 1, 1' have a plurality of functional modules which are preferably configured as programmed software modules and comprise a computer program code for controlling one or more processors of the operating units 1, 1'. The computer program code is stored on one or more computer-readable storage media that can be fixedly or detachably connected to the processors. However, the person skilled in the art will appreciate that in alternative embodiment variants, the functional modules can be partially or completely implemented through hardware components.

The operating units 1, 1' have user interfaces which comprise in particular input/output devices such as, for example, a touchscreen, a keyboard, a display, a camera, a microphone, a loudspeaker, etc. Depending on the application or user specification, the user interfaces of the operating units 1, 1' are set up as graphical user interfaces, as speech-based user interfaces, as gesture-based user interface, etc.

In the case of a graphical user interface, for example, an operating command for operating the production plant 2 is displayed on a touchscreen or display of the operating unit, and is triggered by the user by touching a touchscreen at the appropriate area or by actuating one or more keys of a keyboard.

In the case of an acoustic user interface, for example, triggering an operating command for operating the production plant 2 is carried out by speaking of sentences or spoken commands.

In the case of a gesture-based user interface, for example, triggering an operating command for operating the production plant 2 is carried out by gestures such as, in particular, finger gestures, hand gestures, arm gestures, etc.

The operating units 1, 1' are set up to carry out one or more applications 11, 11' which comprise one or more operating modules 51, 52, 53, 54. In one embodiment, the operating modules 51, 52, 53, 54, instead of being carried out within an application 11, 11', are carried out on the operating units 1, 1' in any other manner, for example as independent processes or applications.

In one embodiment variant, there are one or more identical operating modules 51, 52, 53, 54 on a plurality of operating units 1, 1'. Thus, for example, FIG. 1 schematically illustrates an operating module with the reference number 51 of the operating unit with the reference number 1, which is identical to the operating module with the reference 51' of the operating unit with the reference number 1'. Thus, with the operating module with the reference number 51 and the operating module with the reference number 51', the same functions, tasks etc. can be carried out for operating the production plant 2.

The operating modules 51, 52, 53,54 are set up, for example, to generate user commands in interaction with a user interface of the operating units 1, 1' and thus with one or more users of the operating unit 1 and to transmit said user commands to the production plant 2, whereby, for example, operating functions, monitoring functions, control functions, etc. are triggered.

In one embodiment, one or more operating modules 51, 52, 53, 54 have one or more interfaces for sending and/or receiving data, which are set up to exchange data with an input/output device of the operating units 1, 1', with a production plant 2, with operating modules 51, 52, 53, 54 or with any other devices.

For example, an operating module 51, 52, 53, 54 is set up to transfer data comprising a list with admissible operating commands to an input/output device of the operating unit 1, 1' on which the operating module 51, 52, 53 54 runs. The input/output device of the respective operating unit 1, 1', for example, is set up to display the list with the available operating commands to the user, to request the user to select one or more operating commands and to transmit data relating to the operating command or commands selected by the user to the respective operating module 51, 52, 53, 54. The respective operating module 51, 52, 53, 54 is set up, for example, to carry out operating the production plant 2 according to this operating command.

Operating the production plant 2 comprises, for example, starting or stopping devices of the production plant, for example starting or stopping a feeder of a print product processing plant. Operating the production plant 2 comprises, for example, setting a speed of a device of the production plant, for example setting the speed of a conveyor of a printing product processing plant. Operating the production plant 2 comprises, for example, switching on an auxiliary device of the production plant 2, for example, switching on lighting. Operating the production plant 2 further comprises any other actions, functions, etc. required for operating the production plant 2.

As is shown in FIG. 1, the plurality of operating modules 51, 52, 53, 54, thus, for example, a first operating module 51, a second operating module 52, a third operating module 53 and a fourth operating module 54 each have one or more authorization identifications 61, 62, 63, 64. The authorization identifications 61, 62, 63, 64, for example, a first authorization identification 61, a second authorization identification 62, a third authorization identification 63 and a fourth authorization identification 64 define the authorization for the access of a user to the respective operating modules 51, 52, 53, 54.

In one embodiment variant, the authorization identifications 61, 62, 63, 64 are stored in a storage of the respective operating module 51, 52, 53, 54. In one embodiment, the authorization identifications 61, 62, 63, 64 comprise a user name, a user role or any other identification. The user name, the user role or another identification are stored, for example, in the form of a UID (User Identification), a GID (Group Identification), a string or in any other form.

The operating units 1, 1' comprise different or identical operating modules 51, 52, 53, 54. For example, two first operating modules 51, 51' are provided which are configured identically on the first operating unit 1 and on the second operating unit 1', and in particular also have two identical authorization identifications 61, 61'. The first operating unit 1 and the second operating unit 1' are set up to identically carry out the functions for operating the production plant 2 as provided in accordance with the two first operating modules 51, 51'.

On the first operating unit 1, for example, a second operating module 52 and a third operating module 53 are provided, while on the second operating unit 1', a fourth operating module 54 is provided. Thus, the first operating unit 1 is set up to carry out the functions for operating the production plant 2 as provided according to the second operating module 52 and the third operating module 53, while the second operating unit 1' is set up to carry out the functions for operating the production plant 2 as provided according to the fourth operating module 54. As schematically illustrated in FIG. 1, the second operating module 52 has a further first authorization identification 612 and the second authorization identifications 62, while the third operating module 53 has another further first authorization identification 613 and a third authorization identification 63. The first authorization identification 61, the further first authorization identification 612 and the another further first authorization identification 613 have an identical data content or the same information content.

With the authorization identifications 61, 62, 63, 64, the access to the operating modules 51, 52, 43, 54 is defined. As shown in FIG. 1, the access to the two first operating modules 51, 51' of the first operating unit 1 and the second operating unit 1' is defined by the two first authorization identifications 61, 61'. The access to the second operating module 52 of the first operating unit 1 is defined by the further first authorization identification 612 and the second authorization identification 62. The access to the third operating module 53 of the first operating unit 1 is defined by the another further first authorization identification 613 and the third authorization identification 63. Thus, a user which is enabled to have access to the first operating module 51, which access is defined according to the first authorization identification 61, is also enabled to have access to the second operating module 52 and to the third operating module 53. As schematically illustrated in FIG. 1, a corresponding description applies to the operating modules 51', 54 of the second operating unit 1'.

As shown in FIG. 1, user names 31, 31', 32, 32', 33, 33' and user roles 41, 41', 42, 42', 43, 43' are stored as user identification on the operating units 1, 1'.

The user names 31, 31', 32, 32', 33, 33' comprise, for example, the name and first name of a user, a UID (User Identification), etc. Optionally, the user name comprises a serial number so as to avoid collisions between users having the same name and first name.

The user roles 41, 41', 42, 42', 43, 43' comprise, for example, a role description, a GID (Group Identification), etc. A role description is formed, for example, by a brief description of operating tasks such as, e.g., "administrator", "service person", "machine operator", "apprentice", etc. With role descriptions, for example, operating tasks for operating the production plant are summarized and it is defined for a user of the operating unit 1, 1', which user is allocated a certain user role, which possibilities of access he has to operating modules 51, 52, 53, 54 of the operating unit 1, 1'.

As shown in FIG. 1, in one embodiment, an allocation of the user names 31, 31', 32, 32', 33, 33' to the user roles 41, 41', 42, 42' and an allocation of the user roles 41, 41', 42, 42' to one or more authorization identifications 61, 62, 63 is defined. In order to find out which possibilities of access a user has, thus, on the one hand, his user name or, on the other, the user role can be used, wherein when using the user role, the authorization identifications 61, 62, 63, 64 can be determined in a particularly fast manner.

For example, for the first operating unit 1 according to FIG. 1, the allocation between the user names with the reference numbers 31, 32, 33, the user roles with the reference numbers 41, 42, the authorization identifications with the reference numbers 61, 62, 63, 64 and the operating modules with the reference numbers 51, 52, 53 arises according to the following allocation tables Z1, Z2, Z3:

| | | | | | | | |
|---|---|---|---|---|---|---|---|
| Z1: | 31: | 41 | Z2: | 41: | 61, 62 | Z3: | 61: 51, 52, 53 |
| | 31: | 41, 42 | | 42: | 62, 63 | | 62: 52 |
| | 33: | 42 | | | | | 63: 53 |

Thus, in the example according to FIG. 1, the user with user name with the reference number 31 is allocated the role with the user role with the reference number 41. The user role with the reference number 41 is allocated the authorization identifications with the reference numbers 61, 62. Accordingly, the user with the reference number 31 assumes the role with the reference number 41 and is capable of triggering the functions of those operating modules 51, 52, 53 which have an authorization identification with the reference number 61 or an authorization identification with the reference number 62. In FIG. 1, the operating modules with the reference numbers 51, 52, 53 have the authorization identification with the reference number 61 and 612, 613, respectively, and the operating module with the reference number 52 has the authorization identification with the reference number 62. The user with the reference number 31 which has the role with the reference number 41 is therefore permitted to have access to the operating modules with the reference numbers 51, 52, 53.

In contrast to this, according to the allocation tables Z1, Z2 and according to FIG. 1, respectively, the user with the user name with the reference number 32 is allocated the role with the user role with the reference number 41 and the user role with the reference number 42. As can be seen from the allocation tables Z2, Z3 and the FIG. 1, the user who is allocated to the user name with the reference number 32 therefore has the authorization to carry out the functions of all operating modules 51, 52, 53 of the operating unit 1.

In one embodiment variant it is provided to operate the production plant 2 differently, depending on the authorization identification 61, 62, 63, 64. If, for example, access to the operating module with the reference number 52 is allowed based on the authorization identification with the reference number 612, operating the production plant 2 is carried out in a different manner than in the case that the access takes place based on the authorization identification with the reference number 62. Thus, for example, the one case may relate only to starting or stopping a machine section of the production plant, while in the other case, additionally or alternatively, setting the speed is made possible.

In one embodiment variant it is provided to allow access to an operating module 51, 52, 53, 54 only if all authorization identifications 61, 62, 63, 64 of the respective operating module 51, 52, 53, 54 are cumulatively fulfilled. Thus, for example, in FIG. 1, access to the operating module with the reference number 53 can be blocked for roles with the user role with the reference number 42 since only the authorization identification with the reference number 63 but not the authorization identification with the reference number 613 is allocated to this role.

Figure 2:
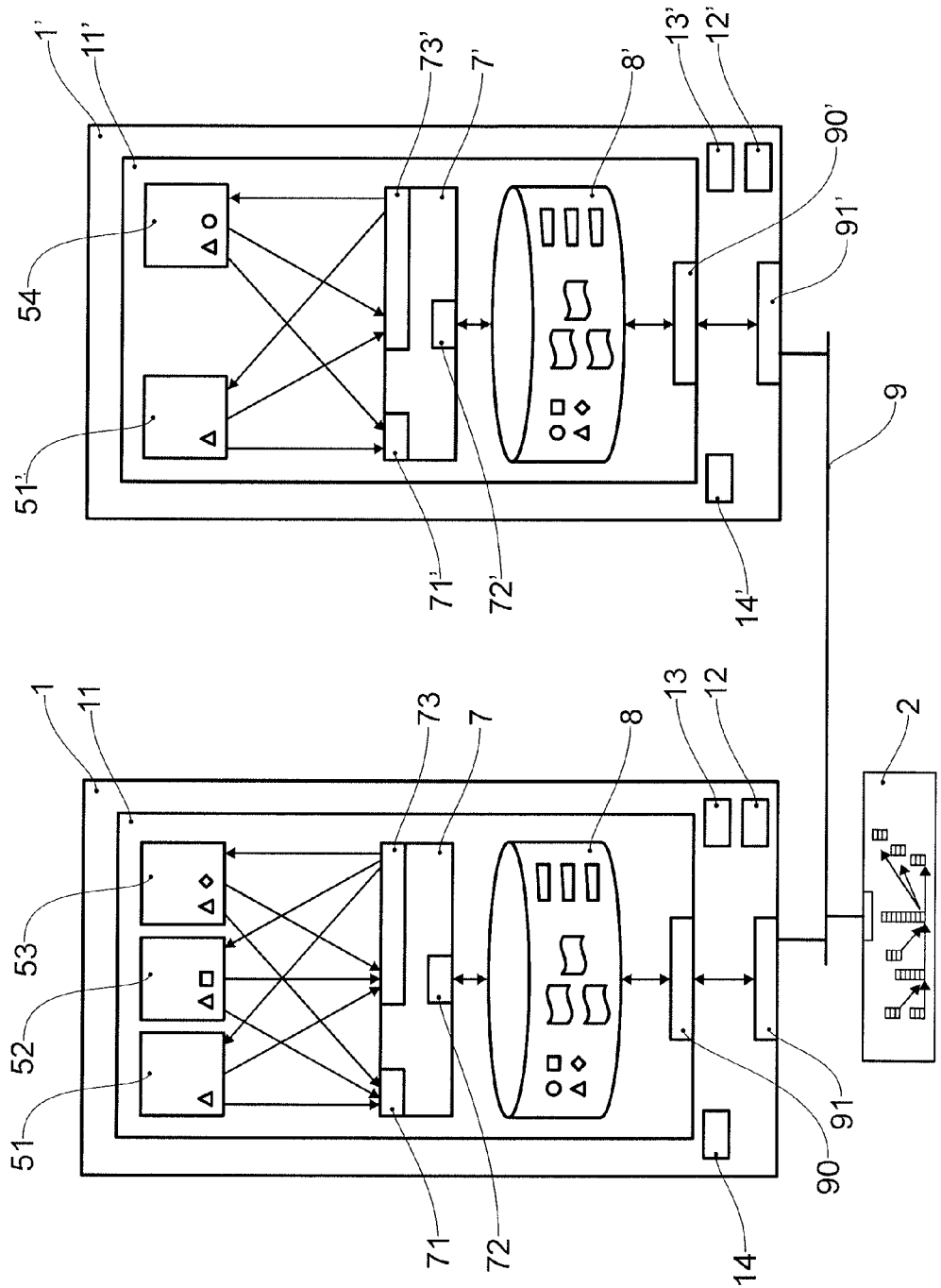
FIG. 2 schematically shows operating units with operating modules, wherein operating modules of the operating units are unlocked according to user identifications and authorization identifications.

FIG. 2 shows schematically operating units 1, 1', each of which have an access controller 7, 7'. Hereinafter, the access controller with the reference number 7 of the operating unit with the reference number 1 is described. The access controller with the reference number 7' is structured correspondingly. The access controller 7 has an authorization receiving module 71, an authorization storage module 72 and an authorization checking module 73. In one embodiment variant, the authorization receiving module 71, the authorization storage module 72 and the authorization checking module 73, instead of being arranged in the access controller 7, are arranged in any other manner in the operating unit 1.

As can be seen from FIG. 2, the operating unit 1 has an authorization receiving module 71 which is set up to receive from one or more operating modules 51, 52, 53, 54, one or more authorization identifications 61, 62, 63, 64 sent out by the respective operating module 51, 52, 53, 54. Communication between the operating modules 51, 52, 53, 54 and the authorization receiving module 71 takes place, for example, through inter-process communication services of an operating system, through storing and reading data in a file system, etc. The authorization identifications 61, 62, 63, 64 comprise, for example, an identifier, for example an integer data type, a description of operating functions which are allocated to the respective authorization identification 61, 62, 63, 64, or any other information.

As can be seen from FIG. 2, the operating unit 1 has an authorization storage module 72 which is set up to store, in an authorization data storage 8 of the operating unit 1, authorization data including allocations of user identifications 31, 32, 33, 34, 41, 42 to the received authorization identifications 61, 62, 63, 64.

The user identifications 31, 32, 33, 34, for example, are stored in advance in the authorization data storage so as to define potential users. The received authorization identifications 61, 62, 63 are subsequently allocated to the available user identifications and stored. For example, the authorization identification with the reference number 61 is allocated in an allocation table to the user identification with the reference number 31, whereby it is defined that the user to whom the user identification with the reference number 31 is allocated has the authorization, as illustrated in FIG. 1, to carry out the functions of the operating modules 51, 52, 53, which functions are allocated to the authorization identification 61.

In one embodiment variant, the authorization data storage 8 comprises a non-volatile storage of the operating unit 1, wherein the stored authorization data are retained when switching the operating unit off and on again. In one variant, the non-volatile storage is implemented as a hard disk, as a memory card such as, e.g., an SD memory card (SD: Secure Digital), as an SSD (Solid State Disk), etc.

As can be seen from FIG. 2, the operating unit 1 has an authorization checking module 73 which is set up to receive from the operating modules 51, 52, 53, 54 at least one authorization identification 61, 62, 63, 64 and to determine at least one user identification 31, 32, 33, 34, 41, 42, and to unlock an operating module 51, 52, 53, 54, from which an authorization identification 61, 62, 63, 64 has been received, to a user defined by the at least one user identification 31, 32, 33, 34, 41, 42 if an allocation of the at least one user identification 31, 32, 33, 34, 41, 42 to the at least one authorization identification 61, 62, 63, 64 is stored in the authorization data storage 8. For example, the at least one user identification 31, 32, 33, 34 comprises a user name, and it is checked if an allocation of the user name 31, 32, 33, 34 to the at least one authorization identification 61, 62, 63, 64 is stored in the authorization data storage 8. In one variant, the user identification comprises a user role 41, 42, and it is checked if an allocation of the user role 41, 42 to the at least one authorization identification 61, 62, 63, 64 is stored in the authorization data storage 8.

In one embodiment variant, the user name 31, 32, 33, 34 and/or the user role 41, 42 is determined through a user validation module 13 as soon as a user uses the operating unit 1 for operating the production plant 2. The user name 31, 32, 33, 34 and/or the user role 41, 42 is stored for later queries, e.g., in a user identification module 12 of the operating unit 1. In one variant, the user name 31, 32, 33, 34 and/or the user role 41, 42 is transmitted by the user validation module 13 to the authorization checking module 73 which is set up for receiving these data. In a further variant, the user name 31, 32, 33, 34 and/or the user role 41, 42 is transmitted by an operating module 51, 52, 53 to the authorization checking module 73. Determining the user name 31, 32, 33, 34 and/or the user role 41, 42 is carried out, for example, with identification data such as the user name/password, fingerprints, facial recognition, etc., which are captured with input means, a fingerprint reader, a camera, etc. of the operating unit 1.

In one embodiment variant, the authorization storage module 72 is set up to store, in the authorization storage 8, authorization data including allocations of user identifications 31, 32, 33, 34, 41, 42 to the received authorization identifications 61, 62, 63, 64 as allocations of user names 31, 32, 33, 34 to user roles 41, 42 and as allocations of user roles 41, 42 to authorization identifications 61, 62, 63, 64. A user role is allocated a role of the user and therefore operating tasks of a user when operating the production plant 2. Defined as roles are, for example, "administrator", "service person", "machine operator", "trainee", etc. From the user role 41, 42 it is determined to which operating modules 51, 52, 53, 54 a user has access based on their authorization identifications 61, 62, 63, 64.

In one embodiment variant, the authorization checking module 73 transmits to an operating module 51, 52, 53, 54 a signalization on whether the access to the operating function is permitted or not, and the operating module 51, 52, 53, 54 performs the respective operating function as soon as it receives the respective signalization. In one variant, the operating module transmits the operating command together with the user identification 31, 32, 33, 34, 41, 42 and/or the authorization identification 61, 62, 63, 64 to the respective operating module 51, 52, 53, 54 which then independently or additionally checks whether or not the operating command is to be submitted to the production plant 2.

In one embodiment variant, the operating unit 1 comprises a synchronization module 90 which is set up to synchronize the authorization data stored in the authorization data storage 8 with authorization data which are stored in a remotely arranged authorization data storage 8' of a remotely arranged operating unit 1'. The synchronization module 90 is set up, for example, to establish a communication connection between the synchronization module 90 and a respective synchronization module 90' of the remotely arranged operating unit 1'. The two synchronization modules 90, 90' are set up, for example, to compare authorization data of the authorization data storage 8 with authorization data of the remotely arranged authorization data 8', and if a difference is found, to copy the data from the one to the other authorization data storage 8, 8', based on rules such as, for example, a timestamp, deletion table, etc., or to overwrite or delete, etc. said data.

In one embodiment variant, the operating unit 1 comprises a master/slave register 14 which is set up to define the operating unit 1 as a master or as a slave, wherein in the case of an operating unit 1 defined as a master, the synchronization module 90 is set up to synchronize the authorization data stored in the authorization data storage 8 only with remotely arranged operating units 1' which are defined as a slave, and in the case of an operating unit 1 defined as a slave, it is set up to synchronize the authorization data stored in the authorization data storage 8 only with a remotely arranged operating unit 1' which is defined as a master.

In one embodiment variant it is ensured that for operating the production plant 2 with a plurality of operating units 1, 1', only a single operating unit 1, 1' is defined as a master and all other operating units are defined as a slave, for example, by storing corresponding data in the master/slave register 14, by dynamically defining a master based on a broadcast, etc. For example, for an operating unit 1, 1' which is defined as a slave, the authorization data are synchronized with the master upon power-up, upon availability of a network 9, upon start-up a new operating module 51, 52, 53, 54, etc., wherein the master subsequently performs a synchronization with all other slaves. This ensures that the authorization data are identical on all operating units 1, 1', and respective operating modules 51, 52, 53, 54 are identically operable by a user.

Figure 3:
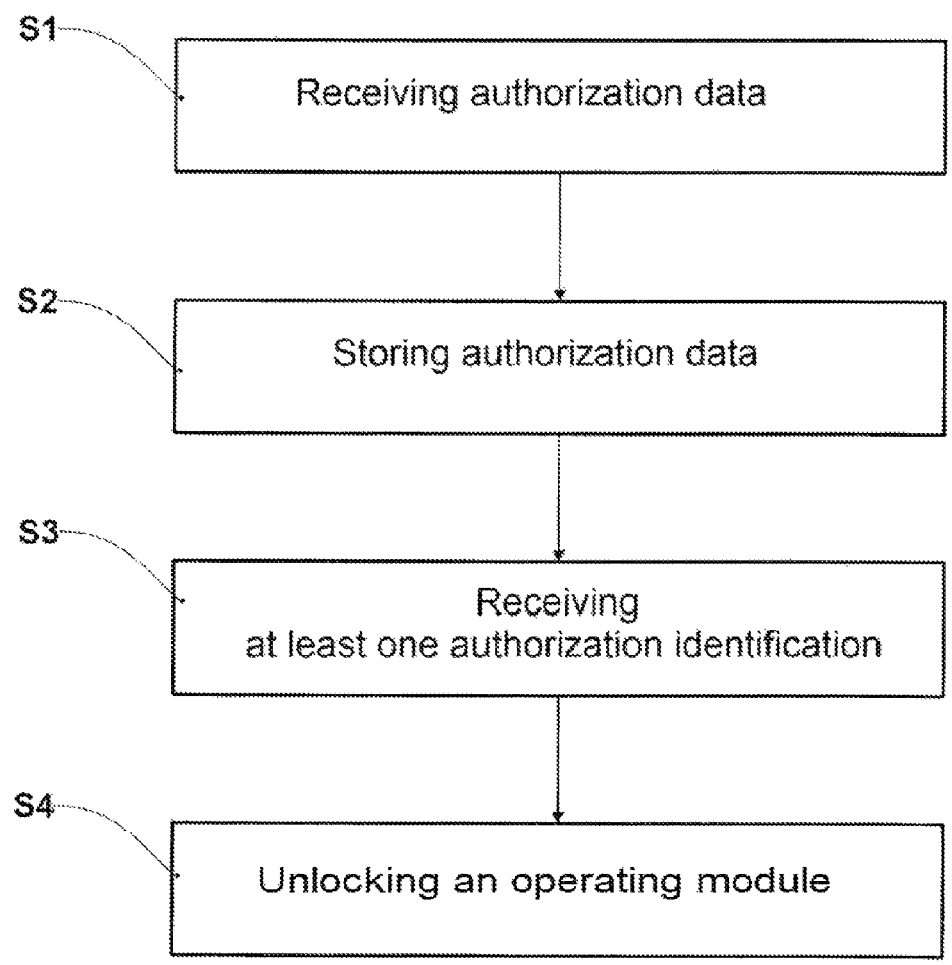
FIG. 3 shows a flow diagram with a sequence of possible steps for operating an operating unit for a production plant.

FIG. 3 schematically shows a flow diagram with a sequence of possible steps for operating an operating unit 1 for a production unit 2. In step S1, authorization identifications 61, 62, 63, 64 are received which are sent out by one or more operating modules 51, 52, 53, 54 of the operating unit 1. In step S2, authorization data including allocations of user identifications 31, 32, 33, 34, 41, 42 to the received authorization identifications 61, 62, 63, 64 are stored in an authorization data storage 8. In step S3, at least one authorization identification 61, 62, 63, 64 is received from the operating modules 51, 52, 53, 54, and at least one user identification 31, 32, 33, 34, 41, 42 is determined. In step S4, an operating module 51, 52, 53, 54, from which an authorization identification 61, 62, 63 has been received, is unlocked to a user defined by the at least one user identification 31, 32, 33, 34, 41, 42 if in the authorization data storage 8 an allocation of the at least one user identification 31, 32, 33, 34, 41, 42 to the at least one authorization identification 61, 62, 63, 64 is stored.

What is claimed is:

1. An operating unit for a production plant comprising:
at least one processor in communication with a non-transitory computer-readable medium, the non-transitory computer-readable medium including instructions that are executable by the at least one processor and configure the operating unit to:
receive authorization identifications which are sent out by operating modules of the operating unit, the authorization identifications forming a basis for defining operating functions for operating the production plant;
store, in an authorization data storage, authorization data including allocations of user identifications to the received authorization identifications;
receive at least one authorization identification from the operating modules;
determine at least one user identification; and
unlock an operating module, from which an authorization identification has been received, to a user defined by the at least one user identification if in the authorization data storage an allocation of the at least one user identification to the at least one authorization identification is stored.

2. The operating unit according to claim 1, wherein the at least one processor is further configured to determine the at least one user identification based on one or more of the following processes: requesting the user identification from a user identification module of the operating unit, receiving the user identification from a user validation module of the operating unit, receiving the user identification from an operating module of the operating unit.

3. The operating unit according to claim 1, wherein the at least one processor is further configured to interact with a user interface of the operating unit in order to request information from a user on the allocation of user identifications to authorization identifications, and to make the allocations in the authorization data storage.

4. The operating unit according to claim 1, wherein the at least one processor is further configured to store, in the authorization data storage, authorization data including allocations of user identifications to the received authorization identification as allocations of user names to user roles and as allocations of user roles to authorization identifications.

5. The operating unit according to claim 1, wherein the at least one processor is further configured to provide an electronic signature in order to protect the authorization data stored in the authorization data storage against abusive change.

6. The operating unit according to claim 1, wherein the at least one processor is further configured to synchronize the authorization data stored in the authorization data storage with authorization data that is stored in a remotely arranged authorization data storage of a remotely arranged operating unit.

7. The operating unit according to claim 6, further comprising a master/slave register configured to define the operating unit as a master or as a slave, wherein in the case of an operating unit defined as the master, the at least one processor is configured to synchronize the authorization data stored in the authorization data storage only with remotely arranged operating units which are defined as the slave, and in the case of an operating unit defined as the slave, it is set up to synchronize the authorization data stored in the authorization data storage only with a remotely arranged operating unit which is defined as the master.

8. The operating unit according to claim 6, wherein the at least one processor is configured to trigger the synchronization between the authorization data stored in the authorization data storage and the authorization data stored in a remotely arranged authorization data storage of a remotely arranged operating unit based on one or more of the following events: end of a time interval, receipt of a trigger signal for synchronization, detection of changes in authorization data stored in the authorization data storage, detection of availability of access of a network interface of the operating unit to a communication network.

9. The operating according to claim 6, wherein the at least one processor is configured to transmit to the synchronization module, after storing authorization data in the authorization data storage, a trigger signal for synchronizing the authorization data with authorization data stored in an authorization data storage of a remotely arranged operating unit.

10. A method for operating an operating unit for a production plant, comprising:
receiving authorization data which are sent out by operating modules of the operating unit, the authorization data forming a basis for defining operating functions for operating the production plant,
storing authorization data including allocations of user identifications to the received authorization identifications in an authorization data storage,
receiving at least one authorization identification from the operating modules and determining at least one user identification and enabling an operating module from which an authorization identification has been received for a user defined by the at least one user identification, if in the authorization data storage an allocation of the at least one user identification to the at least one authorization identification is stored.

11. The method according to claim 10, wherein the at least one user identification is determined based on one or more of the following processes: requesting the user identification from a user identification module of the operating unit, receiving the user identification from a user validation module of the operating unit, receiving the user identification from an operating module of the operating unit.

12. The method according to claim 10, wherein information on the allocation of user identifications to authorization identifications is requested by a user through the interaction with a user interface of the operating unit, and the allocations are made accordingly in the authorization data storage.

13. The method according to claim 10, wherein authorization data including allocations of user identifications to the received authorization identifications are stored in the authorization data storage as allocations of user names to user roles and as allocations of user roles to authorization identifications.

14. The method according to claim 10, wherein the authorization data stored in the authorization data storage are provided with an electronic signature to be protected against abusive change.

15. The method according to claim 10, wherein by means of a synchronization module, the authorization data stored in the authorization data storage are synchronized with authorization data stored in a remotely arranged authorization data storage of a remotely arranged operating unit.

16. The method according to claim 15, wherein the operating unit is defined as a master or as a slave, wherein when the operating unit is defined as the master, the authorization data stored in the authorization data storage are synchronized only with remotely arranged operating units which are defined as the slave, and when an operating unit defined as the slave, the authorization data stored in the authorization data storage are synchronized only with a remotely arranged operating unit which is defined as the master.

17. The method according to claim 15, wherein the synchronization in the synchronization module between the authorization data stored in the authorization data storage and authorization data stored in a remotely arranged authorization data storage of a remotely arranged operating unit is triggered based on one or more of the following events: end of a time interval, receipt of a trigger for synchronization, detection of changes in the authorization data stored in the authorization data storage, detection of availability of access of a network interface of the operating unit to a communication network.

18. The method according to claim 15, wherein after storing authorization data in the authorization data storage, a trigger signal for synchronizing the authorization data with the authorization data stored in an authorization data storage of a remotely arranged operating unit is transmitted to the synchronization module.

19. A computer program product, comprising a non-transitory computer-readable storage medium with a stored computer code which is set up to control one or more processors of an operating unit for a production plant in such a manner that:
authorization identifications are received which are sent out by operating modules of the operating unit, the authorization identifications forming a basis for defining operating functions for operating the production plant, authorization data including allocations of user identifications to the received authorization identifications are stored in an authorization data storage, at least one authorization identification from the operating modules is received and at least one user identification is determined, and an operating module, from which an authorization identification has been received, is unlocked to a user defined by the at least one user identification if in the authorization data storage an allocation of the at least one user identification to the at least one authorization identification is stored.

* * * * *